United States Patent
Carlson et al.

(10) Patent No.: US 8,364,307 B2
(45) Date of Patent: Jan. 29, 2013

(54) DUAL POWER MOTORIZED ROLLER

(75) Inventors: Randall J. Carlson, Grand Rapids, MI (US); Kevin M. Schestag, Grand Rapids, MI (US); Daniel O. Amarandei, Kentwood, MI (US); Wynn M. Pelak, Rockford, MI (US); Randall D. Houtman, Caledonia, MI (US); Matthew T. Brayman, Grand Rapids, MI (US)

(73) Assignee: Dematic Corp., Grand Rapids, MI (US)

( * ) Notice: Subject to any disclaimer, the term of this patent is extended or adjusted under 35 U.S.C. 154(b) by 373 days.

(21) Appl. No.: 12/683,128

(22) Filed: Jan. 6, 2010

(65) Prior Publication Data

US 2010/0179686 A1 Jul. 15, 2010

Related U.S. Application Data

(60) Provisional application No. 61/143,621, filed on Jan. 9, 2009.

(51) Int. Cl.
*B65G 47/46* (2006.01)

(52) U.S. Cl. .......... 700/230; 198/788; 198/370.09; 198/370.1; 198/460.1; 198/781.05

(58) Field of Classification Search ............ 700/230
See application file for complete search history.

(56) References Cited

U.S. PATENT DOCUMENTS

| | | | |
|---|---|---|---|
| 1,448,712 A | 3/1923 | Pool | |
| 1,716,448 A | 6/1929 | Langsdort | |
| 1,825,119 A | 9/1931 | Mug | |
| 2,915,167 A | 12/1959 | Berger | |
| 3,362,686 A | 1/1968 | MacKay | |
| 4,798,275 A * | 1/1989 | Leemkuil et al. | 198/370.1 |
| 4,837,493 A | 6/1989 | Maeno et al. | |
| 4,998,052 A | 3/1991 | Erdman et al. | |
| 5,022,513 A | 6/1991 | Huber | |
| 5,088,596 A | 2/1992 | Agnoff | |
| 5,180,344 A | 1/1993 | Hall | |

(Continued)

FOREIGN PATENT DOCUMENTS

| | | |
|---|---|---|
| EP | 1047182 | 10/2000 |
| EP | 1103496 | 5/2001 |

(Continued)

OTHER PUBLICATIONS

International Preliminary Report on Patentability from corresponding Patent Cooperation Treaty Patent Application No. PCT/US2010/020234 mailed Jul. 21, 2011.

(Continued)

*Primary Examiner* — Gene Crawford
*Assistant Examiner* — Kyle Logan
(74) *Attorney, Agent, or Firm* — Gardner, Linn, Burkhart & Flory, LLP

(57) ABSTRACT

A conveying system may include a frame that supports a plurality of rollers which carry articles thereon. At least one of the rollers may be a motorized roller with first and second motors adapted to rotate an outer cylindrical shell of the motorized roller. A controller external to the motorized roller may send speed control commands to the motorized roller to control both the first and second motors in a manner that increases torque of the motorized roller. The motors may be controlled in four quadrant mode, or two quadrant mode, or a combination thereof. The motorized roller may be used in a right angle transfer mechanism, or in other components of a conveying system.

20 Claims, 7 Drawing Sheets

U.S. PATENT DOCUMENTS

| | | | |
|---|---|---|---|
| 5,215,184 A | 6/1993 | Huber | |
| 5,336,956 A | 8/1994 | Haner | |
| 5,413,209 A | 5/1995 | Werner | |
| 5,442,248 A | 8/1995 | Agnoff | |
| 5,462,156 A | 10/1995 | Kobayashi et al. | |
| 5,632,371 A | 5/1997 | Best et al. | |
| 5,730,274 A | 3/1998 | Loomer | |
| 5,904,239 A | 5/1999 | Narisawa | |
| 5,918,728 A * | 7/1999 | Syverson | 198/788 |
| 5,927,477 A | 7/1999 | Meittunen | |
| 6,021,888 A | 2/2000 | Itoh et al. | |
| 6,035,999 A | 3/2000 | Hall | |
| 6,085,892 A * | 7/2000 | Lem et al. | 198/370.09 |
| 6,124,656 A | 9/2000 | Jensen | |
| 6,206,181 B1 * | 3/2001 | Syverson | 198/788 |
| 6,225,725 B1 | 5/2001 | Itoh et al. | |
| 6,244,427 B1 * | 6/2001 | Syverson | 198/788 |
| 6,253,909 B1 | 7/2001 | Kalm et al. | |
| 6,323,570 B1 | 11/2001 | Nishimura et al. | |
| 6,370,447 B1 * | 4/2002 | Miyazaki | 700/230 |
| 6,378,694 B1 * | 4/2002 | Onoyama et al. | 198/781.06 |
| 6,443,295 B1 | 9/2002 | Hill | |
| 6,672,449 B2 | 1/2004 | Nakamura et al. | |
| 6,731,094 B1 | 5/2004 | Itoh et al. | |
| 6,808,063 B2 | 10/2004 | Itoh et al. | |
| 6,811,018 B2 * | 11/2004 | Cotter et al. | 198/460.1 |
| 6,820,736 B2 * | 11/2004 | Itoh et al. | 198/781.01 |
| 6,899,219 B2 * | 5/2005 | Cotter et al. | 198/781.09 |
| 7,035,714 B2 * | 4/2006 | Anderson et al. | 700/228 |
| 7,040,478 B2 * | 5/2006 | Ehlert | 198/370.09 |
| 7,287,636 B2 * | 10/2007 | Itoh et al. | 198/370.1 |
| 7,360,638 B2 * | 4/2008 | Ko et al. | 198/575 |
| 7,374,036 B2 | 5/2008 | Dingler et al. | |
| 7,383,935 B2 * | 6/2008 | Tasma et al. | 198/370.01 |
| 7,854,314 B2 * | 12/2010 | Pelak et al. | 198/572 |
| 2002/0134646 A1 * | 9/2002 | Itoh | 198/370.1 |
| 2003/0136644 A1 * | 7/2003 | James | 198/780 |
| 2003/0150695 A1 * | 8/2003 | Cotter et al. | 198/460.1 |
| 2003/0209410 A1 * | 11/2003 | Itoh et al. | 198/781.05 |
| 2005/0087428 A1 * | 4/2005 | Pelak et al. | 198/780 |
| 2006/0030968 A1 * | 2/2006 | Ko et al. | 700/213 |
| 2007/0261941 A1 * | 11/2007 | Pelak et al. | 198/781.05 |
| 2008/0169171 A1 * | 7/2008 | Itoh et al. | 198/412 |
| 2009/0152074 A1 * | 6/2009 | Wolf | 198/617 |

FOREIGN PATENT DOCUMENTS

WO    WO2009073906    6/2009

OTHER PUBLICATIONS

International Search Report for PCT Application No. PCT/US2010/020234, the PCT counterpart to the present application.

Written Opinion for PCT Application No. PCT/US2010/020234, the PCT counterpart to the present application.

* cited by examiner

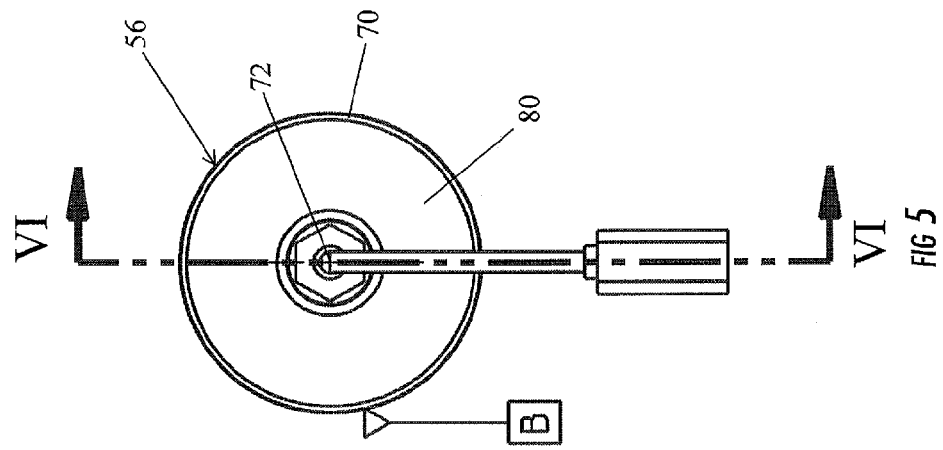
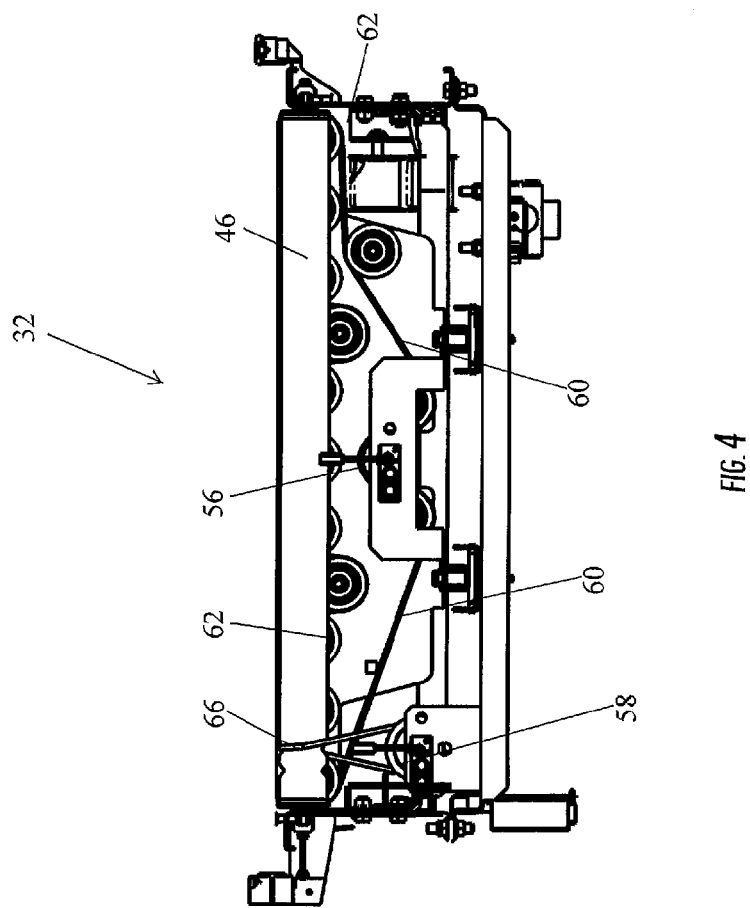
FIG. 5
FIG. 4

DUAL POWER MOTORIZED ROLLER

CROSS-REFERENCE TO RELATED APPLICATIONS

This application claims priority to U.S. provisional patent application Ser. No. 61/143,621 filed Jan. 9, 2009 by Carlson et al. and entitled DUAL POWER MOTORIZED ROLLER, the complete disclosure of which is hereby incorporated herein by reference.

BACKGROUND OF THE INVENTION

The present invention relates to conveying systems, and more particularly to conveying systems employing one or more motorized rollers whose rotation assists in the movement of articles through the conveying system.

Conveying systems for transporting articles that utilize a plurality of rollers for transporting articles are well known. In some such conveying systems, or portions of conveying systems, the articles being transported rest directly on top of the plurality of rollers and are carried by the rollers as the rollers rotate. In other conveying systems, or portions of conveying systems, the articles being transported rest on top of an endless belt that surrounds a plurality of the rollers. In this latter case, the rotation of the rollers causes the endless belt to rotate, thereby transporting the articles carried thereon. Regardless of the type of conveying system, or portion of a conveying system, it is common to include within one or more of the rollers a motor that, when activated, causes the rollers to rotate. The rotation of such a motorized roller may be coupled to one or more neighboring rollers by way of belts, bands, or other structures, such that the rotation of the motorized roller causes the neighboring rollers to rotate as well. Such motorized rollers may be used in virtually any portion of a conveying system, such as on inclines, declines, turns, right angle transfers, and other portions of a conveying system.

SUMMARY OF THE INVENTION

The present invention relates to conveying systems that include one or more motorized rollers used to assist in the movement of articles along portions of the conveying system. In some embodiments, the present invention provides improved motorized rollers that are able to provide greater amounts of torque, and thereby move heavier articles, with minimal, if any, change to the footprint of existing motorized rollers. In other embodiments, motorized rollers with dual motors positioned inside are utilized to power right angle transfer assemblies. In still other embodiments, two quadrant control of motorized rollers with dual motors is utilized, as well as negative speed commands when braking is desired during the use of the two quadrant control.

According to one aspect of the invention, a conveying system for conveying articles is provided. The conveying system includes a frame, a plurality of rollers supported by the frame, a motorized roller, and a controller external to the motorized roller. The plurality of rollers extend from one side of the frame to the other and are adapted to support articles traveling on the conveying system. The motorized roller includes an outer cylindrical shell, a first motor, and a second motor. The first and second motors are adapted to rotate the outer cylindrical shell. The controller controls both the first and the second motors.

According to another embodiment, a method of conveying articles along a conveyor having a conveying surface is provided. The method includes providing a plurality of transverse divert members and a motorized roller. The transverse divert members are adapted to change a direction of movement of the articles being conveyed. The motorized roller includes an outer cylindrical shell that surrounds a first and second motor. The method further includes coupling the motorized roller to the transverse divert members such that the divert members are activated when the motorized roller rotates; sending a first speed command having a first sign and magnitude to the first motor; and sending a second speed command having a second sign and magnitude to the second motor, wherein the second sign is opposite the first sign and the second magnitude is substantially equal to the second magnitude.

According to still other embodiments, a belt may be provided in frictional contact with an outer surface of the shell whereby rotation of the motorized roller activates the plurality of transverse divert members. The motorized roller may be positioned underneath the plurality of rollers at a location where the outer shell of the motorized roller does not come into contact with any of the articles. The control of the first and second motors may both be carried out in a two quadrant mode. The outer shell of the motorized roller may have the same diameter and be constructed of the same material as each of the plurality of rollers. A second motorized roller may be added that is adapted to rotate the plurality of rollers to thereby transport articles positioned thereon. The second motorized roller may be oriented with a longitudinal axis that is parallel to the first motorized roller. Either or both of the first and second motorized rollers may be controlled to switch from a first speed to a slower, second speed by the controller issuing negative speed commands to the motors until the second speed it attained. The transverse divert members may include a plurality of belts adapted to selectively engage articles traveling on the conveyor.

BRIEF DESCRIPTION OF THE DRAWINGS

FIG. 4 is a side, elevational view of the right angle transfer assembly of FIG. 1;

FIG. 5 is an end, elevational view of a motorized roller that may be used in the conveying system of claim 1;

DETAILED DESCRIPTION OF THE EMBODIMENTS

Figure 1:
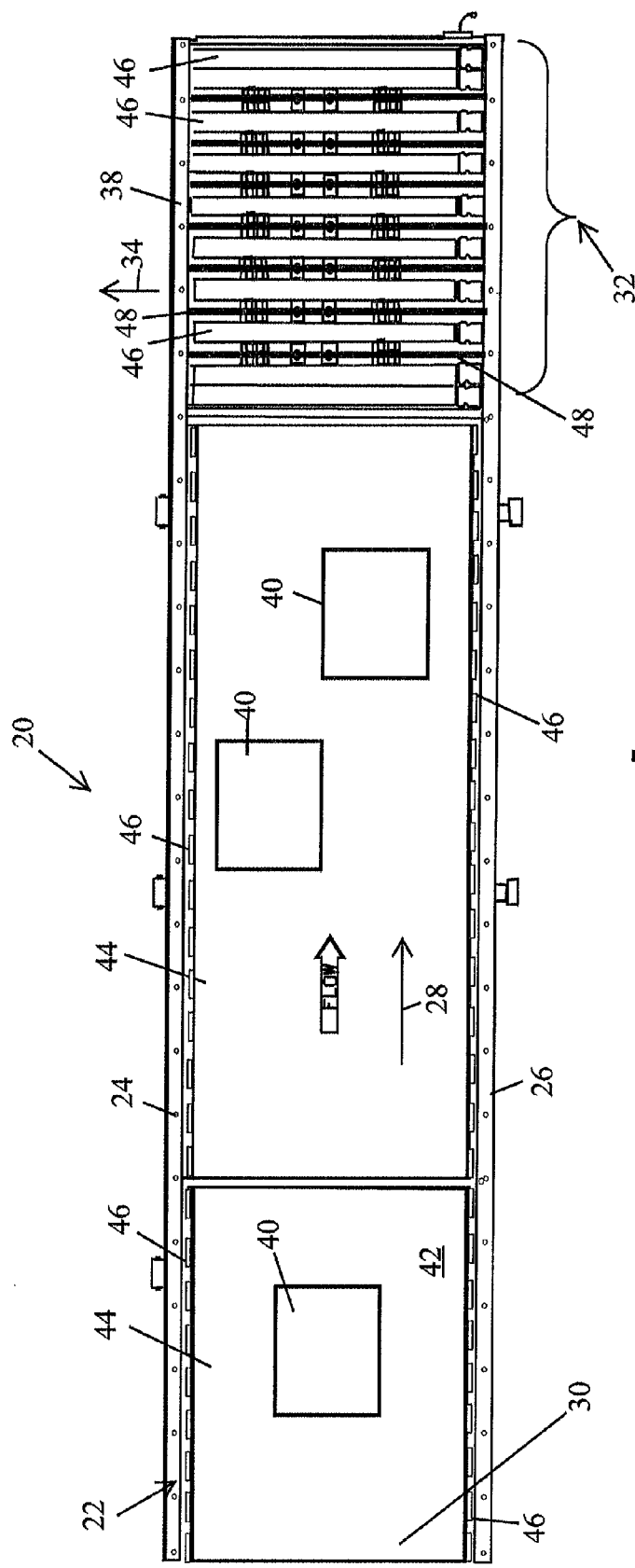
FIG. 1 is a plan view of an illustrative conveying system according to one embodiment.

A conveying system 20 according to one embodiment is illustrated in FIG. 1. Conveying system 20 may be part of a larger material handling system that may include additional conveyor beds and conveying structures that are not illustrated in FIG. 1. Conveying system 20 includes a frame 22 having a first side 24 and a second side 26. Conveying system 20 is adapted to convey articles 40 in a direction of conveyance 28 from an entry point 30 toward a right angle transfer assembly 32. Right angle transfer assembly 32 is adapted to transfer articles in both direction of conveyance 28 and a transverse direction 34. Stated alternatively, right angle transfer assembly 32 is adapted to deliver articles either to a first discharge point 36 or a second discharge point 38, depending upon the desired destination for a particular article 40. One or more additional conveyors, or other receiving structures, (not shown) would typically be placed adjacent each discharge point 36 and 38 to receive the articles 40 and either accumulate them or transport them further throughout the material handling environment.

Conveying system 20 includes a conveying surface 42 that may be defined by one or more belts 44 or one or more rollers 46. In the embodiment illustrated in FIGS. 1 and 2, conveying system 20 includes two sections of conveyor having two endless belts 44. Endless belts 44 are supported by, and travel over the top edges of, rollers 46. The endless belts 44 are in frictional contact with rollers 46 such that the movement of the rollers 46 causes the movement of belts 44, thereby enabling articles 40 positioned thereon to be transported in the direction of conveyance 28.

Figure 2:
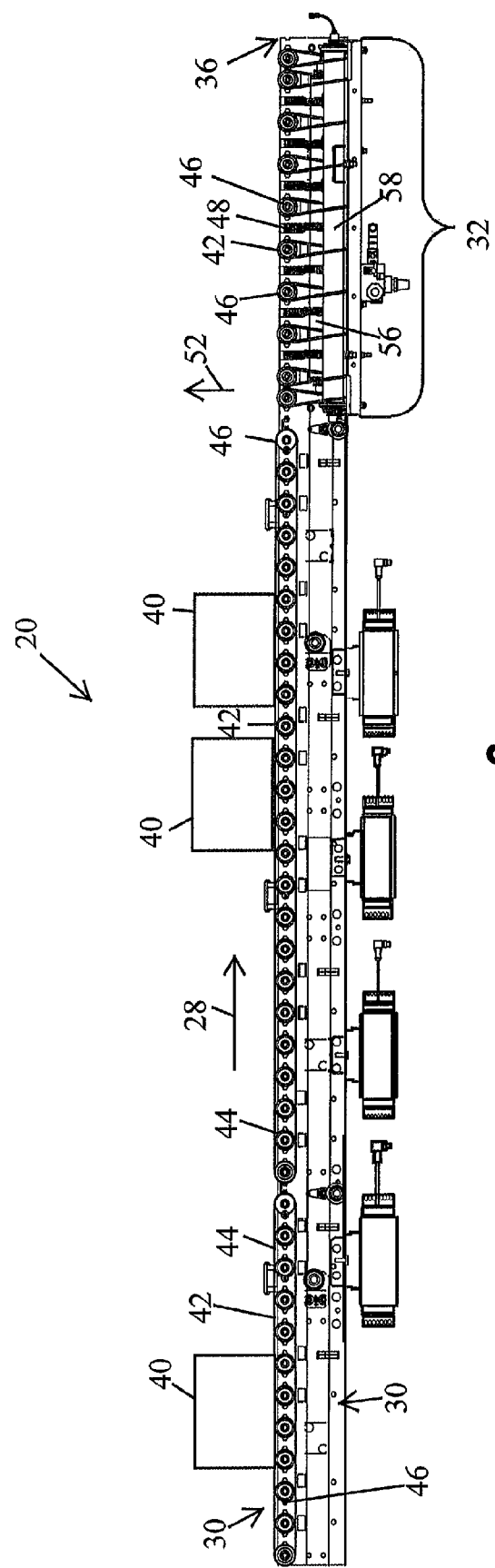
FIG. 2 is a sectional, elevational view of the conveying system of FIG. 1.
Figure 3:
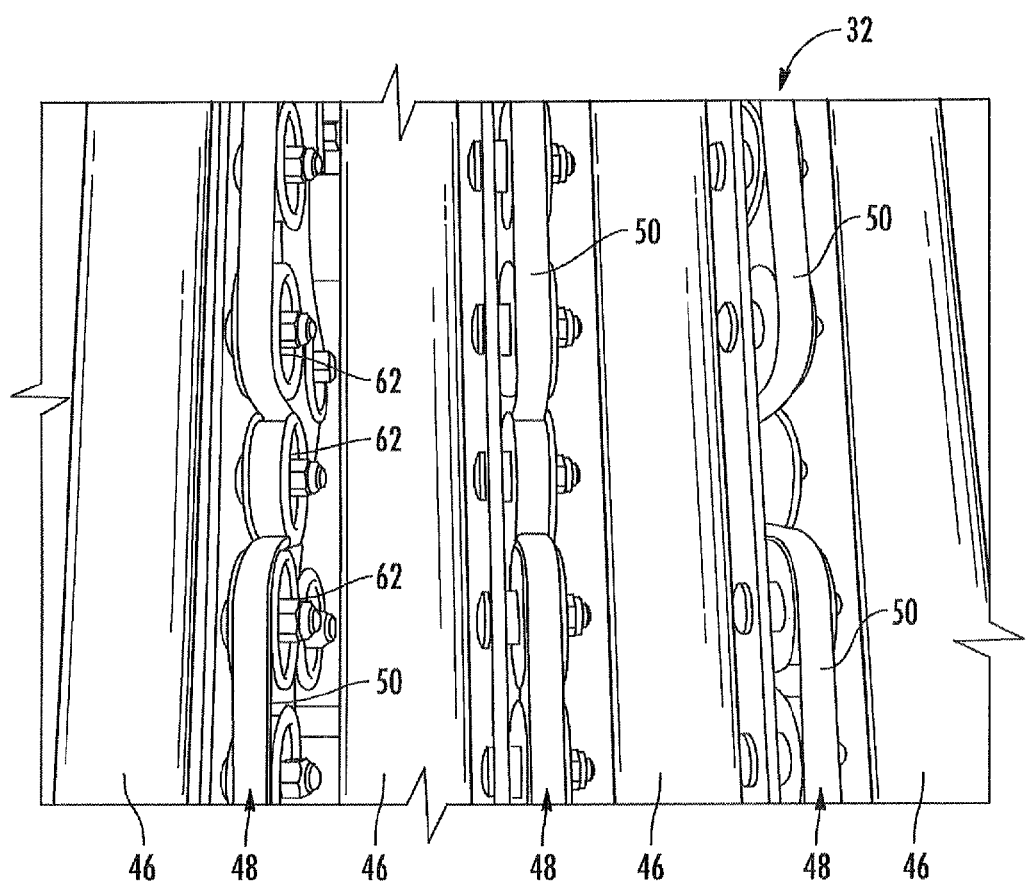
FIG. 3 is a plan view of a portion of a right angle transfer assembly of the conveying system of claim 1.

Right angle transfer assembly 32 also includes a plurality of rollers 46 that, when driven, move an article positioned thereon toward first discharge point 36 (FIGS. 1 and 2). Right angle transfer assembly 32 also includes a plurality of transverse divert members 48 that, in one embodiment, may comprise a plurality of belts 50 (FIG. 3). As is known to those skilled in the art, transverse divert members 48 are moveable in a vertical direction 52 (FIG. 2) between a lowered position and a raised position. In the lowered position, transverse divert members 48 do not come into contact with articles traveling on right angle transfer assembly 32. In the raised position, transverse divert members 48 lift the article 40 positioned thereon off of the rollers 46 of assembly 32 such that the article disengages from rollers 46. In this raised position, the movement of transverse divert members 48 will cause the article 40 to move toward second discharge point 38. In operation, therefore, right angle transfer assembly will maintain transverse divert members 48 in the lowered position when the article traveling thereon is to be delivered to first discharge point 36, and will raise transverse divert members 48 into the raised position when it is time to change the direction of motion of an article 40 such that it moves toward second discharge point 38. The mechanism for raising and lowering transverse divert members 48 and associated components may take on a variety of different forms, as would be known to one of ordinary skill in the art, and therefore need not be discussed further herein.

In the embodiment of right angle transfer assembly 32 shown in FIG. 1, the movement of transverse divert members 48 is carried out by way of a first motorized roller 56 positioned underneath the conveying surface of assembly 32 (FIG. 4). The rotation of first motorized roller 56 about its longitudinal axis causes a belt 60 to move. Belt 60 is reaved around a plurality of wheels 62 (FIGS. 3 and 4) that place belt 60 in frictional contact with a plurality of additional wheels about which belts 50 are reaved. Thus, the rotational motion of first motorized roller 56 causes belts 50 (i.e. transverse divert members 48) to move. First motorized roller 56 is therefore activated when it is desired to move an article 40 transversely off of transfer assembly 32 toward second discharge point 38.

In the embodiment of right angle transfer assembly 32 shown in FIG. 1, the movement of rollers 46 is carried out by way of a second motorized roller 58 positioned underneath the conveying surface of assembly 32. Second motorized roller 58 is in frictional engagement with one or more bands 66 (FIG. 4) that loop around one or more of rollers 46. Bands 66 transfer the rotational motion of second motorized roller 58 to rollers 46. Second motorized roller 58 is therefore activated when it is desired to move an article 40 on transfer assembly 32 toward first discharge point 36.

Figure 6:
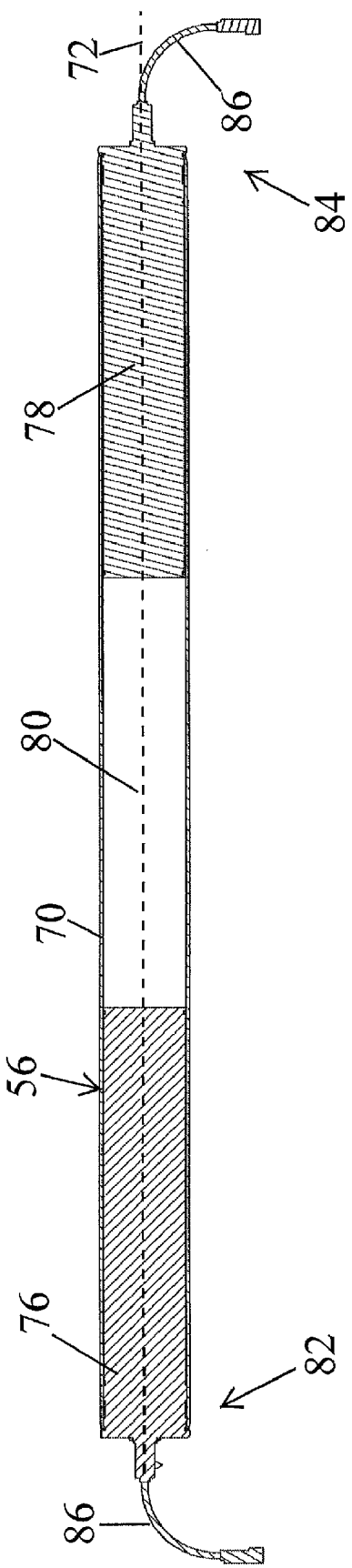
FIG. 6 is a sectional view of the motorized roller of FIG. 5 taken along the line VI-VI.

A side, elevational view of first motorized roller 56 is shown in FIG. 5. First motorized roller 56 includes an outer shell 70 and a longitudinal axis 72 about which motorized roller 56 rotates. A cross sectional view of first motorized roller 56 is shown in FIG. 6. In one embodiment, first motorized roller 56 includes a first motor 76 and a second motor 78 positioned in an interior region 80 inside of shell 70. First motor 76 is positioned adjacent a first end 82 of roller 56 and second motor 78 is positioned adjacent a second, opposite end 84 of roller 56. Each motor 76 and 78 is in communication with a cable 86 that supplies power to the motor, and which may also communicate feedback and other signals from the connected motor back to a controller 90, as will be discussed in greater detail below. When either of motors 76 and 78 receives power, it exerts a torque that causes outer shell 70 to rotate about longitudinal axis 72. The precise design of motors 76 and 78, along with the manner in which they connect to outer shell 70, may be varied, as would be known to one of ordinary skill in the art. In one embodiment, the motors 76 and 78 may be brushless, DC motors. In such an embodiment, the motors 76 and 78 may be implemented as motor cartridges manufactured by the Motor Power Company of Italy under the part number A6S00000110735. Such motor cartridges are manufactured for motorized rollers in which the outer shell 70 includes a 50 millimeter outer diameter. It will be understood, of course, that other motors, motor types, and motor cartridges may be used and that the diameter of the outer shell 70 of motorized rollers 76 and/or 78 may be varied to other dimensions.

In one embodiment, first motorized roller 56 includes both motors 76 and 78 and second motorized roller 58 includes only a single motor (which may be the same type of motor as first and second motors 76 and 78, or it may be of a different type). In other embodiments, second motorized roller 58 may include two motors and first motorized roller 56 may include only a single motor. In still other embodiments, both first and second motorized rollers 56 and 58 may include two motors. In yet other embodiments, two motors, such as motors 76 and 78, may be positioned inside of any one or more of the rollers 46 that either come into direct contact with articles 40, or that support one of the belts 44 over which the articles 40 travel.

Figure 7:
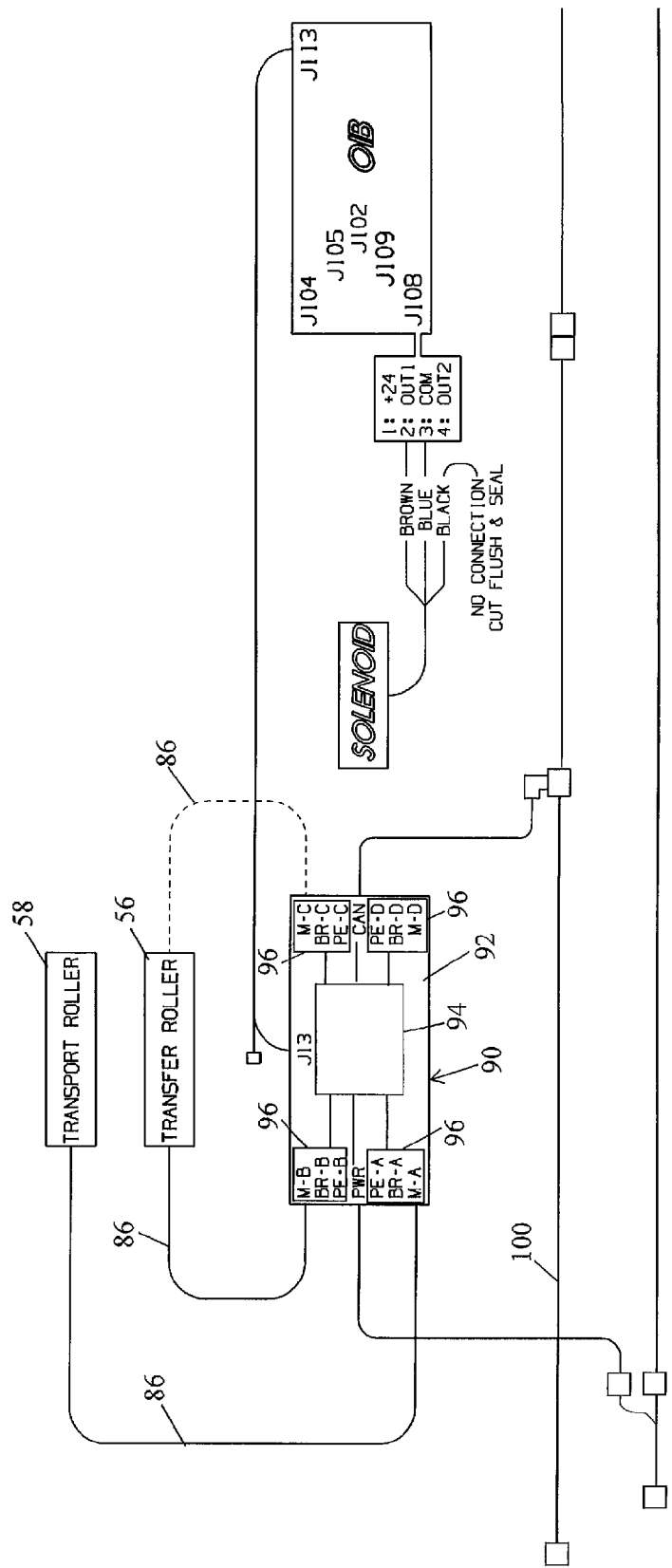
FIG. 7 is a schematic diagram of a controller and associated components that may be used to control the right angle transfer assembly of FIG. 1.
Figure 8:
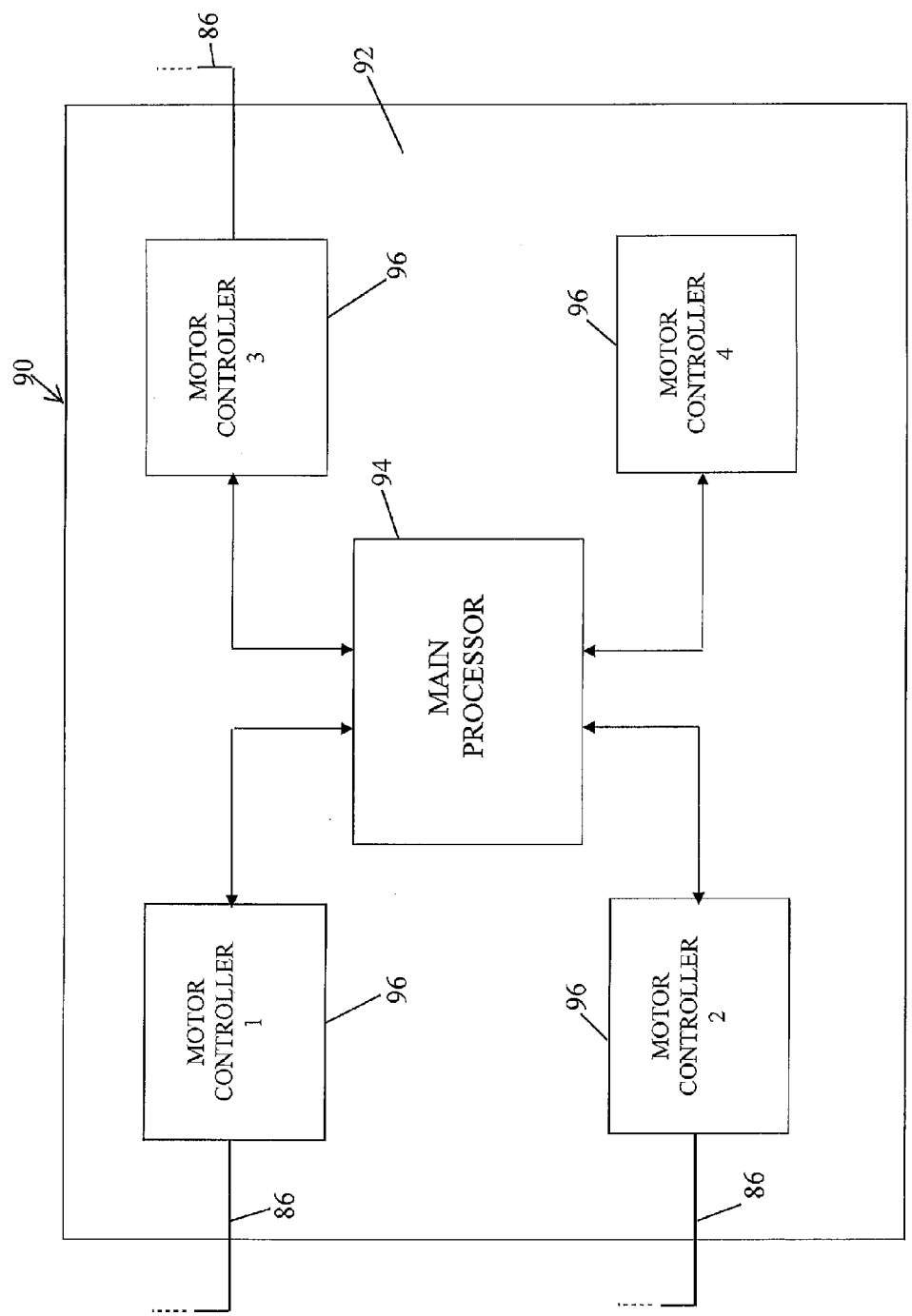
FIG. 8 is a schematic diagram of the controller of FIG. 7.

The control of first motorized roller 56 may be carried out by way of controller 90 (FIGS. 7 and 8). Controller 90, in the embodiments shown in FIGS. 7 and 8, is a collection of electronic components mounted on a printed circuit board 92. The form of controller 90 may vary from that shown, and may take on any form or implementation suitable for carrying out the functions described herein, as would be known to one of ordinary skill in the art. In one embodiment, the electronic components mounted to circuit board 92 include a main processor 94 and a plurality of motor controllers 96. Main processor 94 may be a conventional-off-the-shelf (COTS) processor capable of being programmed to carry out the functions described herein, either in software, firmware, or in any other suitable manner. Motor controllers 96 may likewise be conventional-off-the-shelf motor controllers implemented as integrated circuits. Processor 94 and motor controllers 96 may be implemented in other forms.

One of the motor controllers 96 is in communication with one of the motors inside of either first motorized roller 56 or second motorized roller 58. Another one of the motor controllers 96 is in communication with another one of the motors inside of first motorized roller 56 or second motorized roller 58. A third one of the motor controllers 96 is in communication with yet another one of the motors inside of either first motorized roller 56 or second motorized roller 58. The fourth motor controller 96 may be left unused if only three motors, in total, are used amongst first and second motorized rollers 56 and 58. If, however, both motorized rollers 56 and 58 both contain two motors each, then the fourth motor controller 96 may be used to control such fourth motor. In some embodiments, the third motor controller may be left unused in addition to the fourth motor controller.

The particular motor controlled by a particular motor controller 96 is not material, in at least one embodiment, as each of the motor controllers 96 are identical to each other and each of the motors used inside of motorized rollers 56 and 58 are also identical to each other. If different types of motors are used with rollers 56 and/or 58, then it may be advisable to use different types of motor controllers and match the appropriate motor to the appropriate motor controller. In some embodiments, controller 90 may include only two motor controllers 96 that are used to control first and second motors 76 and 78 inside of first motorized roller 56.

In the illustrated embodiment, each motor controller 96 controls its respective motor by way of cable 86. That is, motor controller 96 sends the appropriate voltages and electrical current to the controlled motor in order to cause the motor to operate at the desired speed. In one embodiment, each cable 86 may include at least six separate wires: three power supplies wires that each deliver power to the motor at three different phases (such as 120 degrees out of phase with respect to each other), and three feedback wires that deliver position feedback signals to motor controller 96 from internal Hall-effect sensors positioned inside of the motors. Additional wires may also be included that either deliver additional signals to the motors, or return additional information back to motor controller 96 and/or main processor 94. Such additional feedback information may include temperature readings and/or other information.

Controller 96 may be in communication with other control elements of conveying system 20 via a network 100 (FIG. 7). In the embodiment shown, network 100 is a Controller Area Network (CAN) that connects controllers 96 with additional electronic components of the overall conveying system 20. Such additional electronic components may include one or more additional controllers that may send commands to controller 96 indicating when it should divert articles toward first discharge point 36 and when it should divert articles toward second discharge point 38. Alternatively, the form of the information and/or commands received over network 100 by controller 96 may be varied. Regardless of the specific format of the information transmitted over network 100, controller 96 carries out the control of first and second motorized rollers 56 and 58 in such a manner as to deliver the articles 40 to the appropriate discharge points 36 and 38.

Controller 90 carries out the control of motors 76 and 78 (and also, in at least one embodiment, the motor inside of second motorized roller 58) by sending from main processor 94 one or more speed commands to the respective motor controllers 96. The speed commands from main processor 94, as mentioned above, may be based upon information received over network 100. Each motor controller 96 receives the speed commands and transmits the appropriate voltages and current over cables 86 to the respective motors to cause the motors to operate at the commanded speed.

In the illustrated embodiment, the speed commands transmitted by main processor 94 to the respective motor controller 96 each include a sign and a magnitude. The sign indicates the direction in which the motor should rotate, while the magnitude indicates the speed at which the motor should rotate. Because the first and second motors 76 and 78 positioned inside of first motorized roller 56 are oriented in opposite directions—that is, cable 86 of first motor 76 in FIG. 6 extends out of the left end of motor 76 while cable 86 of second motor 78 extends out of the right end of motor 78—the speed commands sent to the motor controller 96 for first motor 76 have a sign that is opposite to the speed commands sent to the motor controller 96 for second motor 78. Were the speed commands to have the same sign, then first and second motors 76 and 78 would attempt to rotate outer shell 70 in opposite directions, thereby causing motors 76 and 78 to work against each other. In one embodiment, the magnitude of the commands sent to the motor controllers 96 for first and second motors 76 and 78 is the same, or substantially the same, for both motors.

The control of the motors 76 and 78 may be carried out in a two quadrant mode, as would be understood by one of ordinary skill in the art. Such two quadrant mode allows the first and second motors 76 and 78 to essentially freewheel to a certain extent such that the motors 76 and 78 do not exert torques that are opposed to each other. It is also within the scope of several embodiments to utilize four quadrant control mode or a combination of both two quadrant and four quadrant modes in the same controller 90.

The combination of two motors 76 and 78 inside of first motorized roller 56 produces a motorized roller that is capable of generating substantially twice as much torque as motorized roller 56 would otherwise be able to generate were it to include only a single one of motors 76 or 78. This enables conveying system 20—in particular, transverse divert members 48—to move articles of greater weight. Further, this additional torque is accomplished without increasing the footprint of motorized roller 56 or any of the other components of conveying system 20. That is, a conveying system 20 that utilized a first motorized roller 56 having only a single motor could be upgraded to include a second motor without having to modify any of the physical construction of the conveying system apart from the insertion of a second motor inside roller 56. This stands in contrast to the physical modifications to the structure of such a conveying system that would likely have to be made were the single motor inside of roller 56 replaced with a larger roller, or were additional motorized rollers added to provide increased torque levels.

Second motorized roller 58 may also be controlled via a motor controller 96 that acts in a two quadrant mode, or it may be controlled by a motor controller 96 that acts in a four quadrant mode. If either of motorized rollers 56 or 58 are configured in a particular embodiment to be controlled in a two quadrant mode, main processor 94 may be programmed to brake either or both of the two quadrant controlled rollers 56 and/or 58 by issuing reverse speed commands for a length of time sufficient to bring about the desired deceleration. That is, if the motor inside of second motorized roller 58 is controlled in a two quadrant mode, for example, and it was desired to change the current speed of motorized roller 58 to a slower speed, main processor 94 would issue a speed command to the associated motor controller 96 that commanded motorized roller 58 to rotate in a direction opposite to its current direction of rotation. This would result in the motor inside of motorized roller 58 applying a reverse torque to outer shell 70. Main processor 94 would continue to apply this reverse speed command until the speed of the motor inside of second motorized roller 58 had been reduced to its desired slower speed. Upon reaching the desired slower speed, main processor 94 would terminate the reverse speed commands and transmit a speed command to the corresponding motor controller 96 directing it to run the motor for roller 58 at the desired slower speed. The use of such reverse speed commands enables controller 90 to slow down rollers 56 and/or 58 in a more responsive manner than might otherwise be possible, particularly if a heavy article is applying a load to rollers 56 and/or 58 that includes substantial inertia. Such reverse speed commands allow a braking force to be applied to either of rollers 56 or 58 while utilizing two quadrant mode control, thereby providing control of the respective motors in a manner that simulates, in some respects, four quadrant control.

In the embodiments illustrated, first and second motorized rollers 56 and 58 have the same diameter, the same length, and are made of substantially the same material as each other. Further, in the embodiments illustrated, first and second motorized rollers 56 and 58 have the same diameter, length, and outer shell 70 material as the rollers 46 used in other parts of the conveying system 20. By using rollers with common dimensions and materials, the number of parts necessary for constructing conveying system 20 is reduced, thereby reducing the overall cost of building and implementing the system. Using common materials and dimensions for rollers 56 and 58 also allows for the motorized rollers to be inserted into other parts of conveying system 20, such as where any of the rollers 46 are positioned, or any other location where a motorized roller would be desired. Such motorized rollers may include one or two motors. When two motors are included, the motorized roller will be able to generate additional torque within substantially the same space previously occupied by the roller being replaced by the dual motor motorized roller. It will therefore be understood that a dual motor motorized roller, such as first motorized roller 56, may be positioned in any other location within conveying system 20 where it is desirable to include a motorized roller having increased torque capabilities, as well as inside any other additional conveying components (not shown) that might be used with conveying system 20 that utilize motorized rollers. In other embodiments, the dimensions and/or materials of motorized roller 56 and/or 58 may be different from each other, and/or different from rollers 46.

Changes and modifications in the specifically described embodiments can be carried out without departing from the principles of the invention which is intended to be limited only by the scope of the appended claims, as interpreted according to the principles of patent law including the doctrine of equivalents.

What is claimed is:

1. A conveying system for conveying articles, said system comprising:
   a frame having a first side and a second side;
   a plurality of rollers supported by said frame and extending from said first side to said second side, said plurality of rollers adapted to support the articles traveling on said conveying system, each of said rollers adapted to rotate about a longitudinal axis;
   a motorized roller, said motorized roller including an outer cylindrical shell, a first motor positioned within said shell at a first end of said motorized roller, and a second motor positioned within said shell at a second end of said motorized roller, said first and second motors adapted to rotate said outer cylindrical shell; and
   a controller, said controller adapted to control both said first and said second motors, wherein said controller is adapted to control said first motor in a four quadrant mode and said second motor in a two quadrant mode wherein said second motor is allowed to freewheel when needed.

2. The system of claim 1 further including:
   a belt in frictional contact with an outer surface of said shell;
   a plurality of transverse divert members adapted to change a direction of movement of the articles on the conveyor, wherein said belt is coupled to said plurality of transverse divert members such that rotation of said motorized roller activates said plurality of transverse divert members.

3. The system of claim 2 wherein said motorized roller is positioned underneath said plurality of rollers at a location where said outer shell of said motorized roller does not come into contact with any of the articles.

4. The system of claim 1 wherein said outer shell has the same diameter and is constructed of the same material as said plurality of rollers.

5. The system of claim 1 wherein said plurality of rollers are each adapted to contact said articles as said articles are conveyed by said conveying system.

6. A conveying system for conveying articles, said system comprising:
   a frame having a first side and a second side;
   a plurality of rollers supported by said frame and extending from said first side to said second side, said plurality of rollers adapted to support the articles traveling on said conveying system, each of said rollers adapted to rotate about a longitudinal axis;
   a motorized roller, said motorized roller including an outer cylindrical shell, a first motor positioned within said shell at a first end of said motorized roller, and a second motor positioned within said shell at a second end of said motorized roller, said first and second motors adapted to rotate said outer cylindrical shell; and
   a controller, said controller adapted to control both said first and said second motors, wherein said controller is adapted to send speed commands of equal magnitude but opposite sign to said first and second motors, respectively and wherein said controller is adapted to control at least one of said first and second motors in a two-quadrant mode wherein said at least one of said first and second motors is allowed to freewheel when needed.

7. The system of claim 6 wherein said controller is adapted to control both said first and said second motors in a two quadrant mode.

8. The system of claim 6 further including a second motorized roller, said second motorized roller including at least one motor contained therein, said second motorized roller adapted to rotate said plurality of rollers to thereby transport articles positioned on said plurality of rollers.

9. The system of claim 8 wherein the longitudinal axis of said motorized roller is oriented parallel to a longitudinal axis of said second motorized roller.

10. The system of claim 9 wherein said controller includes a two quadrant motor controller adapted to control said second motorized roller.

11. The system of claim 10 wherein said controller further includes a main processor adapted to control said two quadrant motor controller, said main processor adapted to send a negative speed command to said two quadrant motor controller when slowing a speed of said second motorized roller from a first rotational speed to a second rotational speed, said main processor terminating said negative speed command when said second rotational speed is reached.

12. A conveying system for conveying articles, said system comprising:

a frame having a first side and a second side;

a plurality of rollers supported by said frame and extending from said first side to said second side, said plurality of rollers adapted to support the articles traveling on said conveying system, each of said rollers adapted to rotate about a longitudinal axis;

a motorized roller, said motorized roller including an outer cylindrical shell, a first motor positioned within said shell at a first end of said motorized roller, and a second motor positioned within said shell at a second end of said motorized roller, said first and second motors adapted to rotate said outer cylindrical shell; and a controller, said controller adapted to control both said first and said second motors, wherein said controller includes:

a main processor;

a first motor controller in communication with said main processor and adapted to control said first motor based upon speed commands received from said main processor;

a second motor controller in communication with said main processor and adapted to control said second motor based upon speed commands received from said main processor;

wherein said main processor is adapted to send a negative speed command to said first and second motor controllers when slowing a speed of said motorized roller from a first rotational speed to a second rotational speed, said main processor terminating said negative speed command when said second rotational speed is reached.

13. A method of conveying articles along a conveyor having a conveying surface upon which articles are conveyed by a plurality of transverse divert members adapted to change a direction of movement of articles being conveyed, said method comprising;

providing a motorized roller having an outer cylindrical shell surrounding a first motor and a second motor;

coupling said motorized roller to said plurality of transverse divert members such that said plurality of transverse divert members are activated when said motorized roller rotates;

sending a first speed command having a first sign and a first magnitude to said first motor; and sending a second speed command having a second sign and a second magnitude to said second motor, said second sign opposite said first sign, and said second magnitude substantially equal to said second magnitude further including controlling said first motor in a four quadrant mode and said second motor in a two-quadrant mode wherein said second motor is allowed to freewheel when needed.

14. The method of claim 13 further including:

providing a plurality of rollers adapted to transport articles;

providing a second motorized roller having a third motor, said second motorized roller adapted to rotate said plurality of rollers when said third motor is activated;

sending a third speed command to said third motor in order to rotate said plurality of rollers.

15. The method of claim 14 further including controlling said third motor in a two quadrant mode.

16. The method of claim 15 further including sending a negative speed command to said third motor in order to change a speed of said third motor from a first speed to a second speed, wherein said first speed is higher than said second speed.

17. The method of claim 14 wherein said motorized roller is positioned underneath said plurality of rollers at a location where said outer shell of said motorized roller does not come into contact with any of the articles.

18. The method of claim 14 further including controlling both said first and said second motors in a two quadrant mode.

19. The method of claim 13 wherein said motorized roller is positioned in a location at which said outer shell comes into contact with said articles.

20. The method of claim 13 wherein said transverse divert members include a plurality of belts adapted to selectively engage articles on the conveyor.

* * * * *